United States Patent
Squire et al.

(10) Patent No.: US 7,740,894 B2
(45) Date of Patent: Jun. 22, 2010

(54) FIBER-CONTAINING RICE-BASED CEREALS AND METHODS OF PREPARATION

(75) Inventors: George McDonald Squire, Battle Creek, MI (US); Andrew McPherson, Mt. Prospect, IL (US); Edward Larue, Portage, MI (US); Louise Slade, Morris Plains, NJ (US); Lynn Haynes, Morris Plains, NJ (US)

(73) Assignee: Post Foods, LLC, St. Louis, MO (US)

( * ) Notice: Subject to any disclaimer, the term of this patent is extended or adjusted under 35 U.S.C. 154(b) by 675 days.

(21) Appl. No.: 11/219,928

(22) Filed: Sep. 6, 2005

(65) Prior Publication Data

US 2007/0054029 A1    Mar. 8, 2007

(51) Int. Cl.
*A23L 1/164* (2006.01)

(52) U.S. Cl. .............. 426/619; 426/620; 426/621; 426/629

(58) Field of Classification Search .......... 426/620, 426/621, 619, 629
See application file for complete search history.

(56) References Cited

U.S. PATENT DOCUMENTS

| 6,045,847 | A  | * | 4/2000 | Nakamura et al. | ...... 426/508 |
| 6,248,379 | B1 | * | 6/2001 | Capodieci et al. | ....... 426/93 |

* cited by examiner

*Primary Examiner*—Helen F Pratt
(74) *Attorney, Agent, or Firm*—Fitch, Even, Tabin & Flannery

(57) ABSTRACT

Methods for providing cooked rice with enhanced levels of fiber, wherein the fiber-containing cooked rice is suitable and especially adapted for use in preparing fiber-containing rice-based cereal products and especially for preparing fiber-containing puffed rice-based cereal products, are provided.

23 Claims, 1 Drawing Sheet

FIBER-CONTAINING RICE-BASED CEREALS AND METHODS OF PREPARATION

FIELD OF THE INVENTION

This invention is directed to fiber-containing rice-based cereals and methods of preparation. More specifically, this invention is directed to methods for providing cooked rice with enhanced levels of fiber, wherein the fiber-containing cooked rice is suitable and especially adapted for use in preparing fiber-containing rice-based cereal products and especially for preparing fiber-containing puffed rice-based cereal products.

BACKGROUND OF THE INVENTION

Fiber is an important dietary component. Typical grains (including cereals prepared from such grains), fresh vegetables and fruits, and the like are an important source of dietary fiber. Rice, including rice-based cereals, however, do not typically provide a significant amount of fiber.

Most of the nutrients (including fiber and B vitamins) of whole rice are found in the outer layer or kernel (i.e., the bran). Rice bran also contains lipase enzymes which can cause rancidity within a relatively short time after harvesting. Thus, typically the bran (along with its fiber and nutrients) are removed before using the rice to prepare commercial food products (e.g., cereals). Such treated rice (e.g., cleaned and hulled) generally contains less than about 1 percent total dietary fiber (including soluble and insoluble fiber). Thus, cereals prepared from rice are typically not good sources of fiber.

Incorporation of fiber in rice without adversely affecting its performance in cereal manufacture has not been possible on a commercial scale. For example, U.S. Pat. No. 6,248,390 (Jun. 19, 2001) provides a "fiber water" containing significant levels of water soluble dietary fiber. This fiber water can be used to enrich foods, such as rice, by cooking the foods in fiber water. Cooked rice prepared in this manner does indeed provide a good source of fiber. The cooked rice, however, is not suitable for preparing rice-containing cereals, especially, puffed rice cereals, due to both its high water levels and the stickiness of the cooked rice. Such rice is simply not suitable for use in a conventional commercial cereal making production line.

Moreover, adding fiber after the rice has been cooked (i.e., during the later stages of cereal manufacture) has not been successful. The added fiber interferes with the manufacture process (e.g., prevent other coating materials to adhere to or penetrate the cereal particles), simply fails to adhere to the cereal particles themselves, and/or tends to agglomerate the cereal particles together. In any event, a satisfactory cereal product has not been possible.

Consequently, there remains a need to provide rice-based cereals containing relatively high levels of fiber. The present invention provides such methods using a fiber-infusion process during the cooking step.

SUMMARY OF THE INVENTION

This invention is directed to fiber-containing or fiber-infused rice-based cereals and methods of preparation. More specifically, this invention is directed to methods for providing cooked rice with enhanced levels of fiber, wherein the fiber-containing cooked rice is suitable and especially adapted for use in preparing fiber-containing or fiber-infused rice-based cereal products and especially for preparing fiber-containing puffed rice-based cereal products.

In the present invention, the soluble fiber is infused into the rice during the cooking process. Dried rice, preferably cleaned and hulled rice, is first partially cooked to for a partially hydrated rice with a moisture content of about 10 to 20 percent. The partially hydrated rice is then mixed with a soluble fiber and gently mixed to form a homogenous mixture of the partially cooked rice and soluble fiber. The homogenous mixture is then further cooked to complete cooking of the rice to obtained a cooked rice with a moisture content of about 28 to about 42 percent and which is infused with the soluble fiber. Although not wishing to be limited by theory, it appears that the soluble fiber is solubilized during this final cooking step and then imbibed into the rice particles as they swell. In any event, the resulting cooked rice has an enhanced level of soluble fiber as well as good physical and chemical properties (i.e., non-sticky and suitable moisture content) which make it ideal for cereal manufacture. Indeed, the resulting cooked rice surprisingly has better physical properties (i.e., non-stickiness) than conventional rice prepared without soluble fiber normally used to prepare rice-based cereal.

The present invention provides method for producing a fiber-containing rice-based cereal, said method comprising:
 (1) precooking dried rice to form a partially hydrated rice having a first moisture content of about 10 to about 20 percent;
 (2) adding soluble fiber to the partially hydrated rice to form a rice-fiber composition;
 (3) gently mixing the rice-fiber composition to form a homogeneous mixture of the partially hydrated rice and soluble fiber;
 (4) cooking the homogenous mixture to complete hydration of the rice to obtain a cooked rice composition wherein the rice is infused with the soluble fiber and wherein the cooked rice composition has a second moisture content of about 28 to about 42 percent;
 (5) drying the cooked rice composition to a third moisture content of about 15 to about 23 percent to obtain a dried cooked rice composition; and
 (6) treating the dried cooked rice composition to form the fiber-containing rice-based cereal;
 wherein the fiber-containing rice-based cereal contains about 5 to about 25 percent total dietary fiber.

This invention also provides a method of preparing fiber-infused cooked rice, said method comprising:
 (1) precooking dried rice to form a partially hydrated rice having a first moisture content of about 10 to about 20 percent;
 (2) adding soluble fiber to the partially hydrated rice to form a rice-fiber composition;
 (3) gently mixing the rice-fiber composition to form a homogeneous mixture of the partially hydrated rice and soluble fiber;
 (4) cooking the homogenous mixture to complete hydration of the rice to obtain a cooked rice composition wherein the rice is infused with the soluble fiber and wherein the cooked rice composition has a second moisture content of about 28 to about 42 percent; and
 (5) drying the cooked rice composition to a third moisture content of about 15 to about 23 percent to obtain the fiber-infused cooked rice,
 wherein the fiber-infused cooked rice contains about 5 to about 25 percent total dietary fiber. The fiber-infused cooked rice is ideally suited for preparing fiber-enriched rice-based cereals. The fiber-infused cooked rice can, however, be used in other rice-containing food products or used to prepare other rice-containing food products.

DETAILED DESCRIPTION

Figure 1:
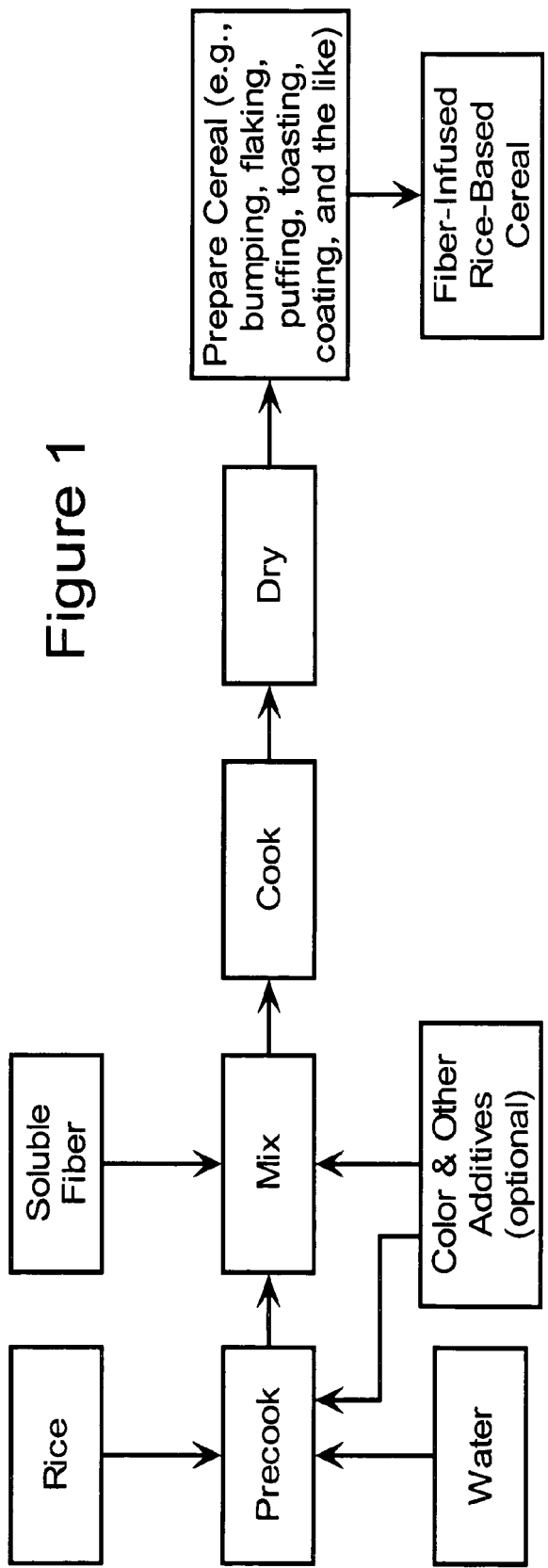
FIG. 1 provides a general flow diagram illustrating the process of this invention for preparing a fiber-containing rice-based cereal product.

The general process of the present invention for preparing a fiber-containing or fiber-infused rice-based cereal product is shown in FIG. 1. Rice and water are precooked to partially hydrate the rice. Generally the extent of precooking should be sufficient to provide a moisture content of about 10 to 20 percent, and preferably about 14 to about 16 percent, for the precooked rice. Optional ingredients can be present during the precooking step; such optional ingredient include, for example, colorants, salt, minerals, emulsifiers, other processing aids, and the like which are normally used in cereal manufacture. The soluble fiber is then added to the precooked rice and gently agitated (e.g., by gently rotating the cooker or other container) until a homogenous precooked rice and soluble fiber is obtained. If desired, optional additives including, for example, colorant, salt, minerals, emulsifiers, other processing aids, and the like which are normally used in cereal manufacture can be added during the mixing step rather than before the precooking step. Preferably, at least the colorant (if used) is added in this mixing step at levels normally used in cereal manufacture since the homogenous distribution of colorant throughout the rice can effectively be used to determine the length of this mixing step necessary to achieve a homogenous mixture of the precooked rice and soluble fiber. Although the time required to obtain a homogenous mixture will vary depending on the equipment used, generally a mixing time of about 10 to 60 minutes is sufficient. The agitation should generally not introduce significant mechanical stress into the mixture to break the individual rice grains, especially when the rice is intended to be puffed and otherwise desired to maintain the individual grains in the final cereal product.

Once the homogenous precooked rice and soluble fiber mixture is obtained, it is subjected to a cooking step to complete cooking of the rice. Generally, the moisture content of the final cooked is about 28 to about 42 percent, and preferably about 30 to about 35 percent. Although not wishing to be limited by theory, it appears that the soluble fiber is solubilized during this final cooking step and then imbibed into the rice particles as they swell. In any event, the resulting cooked rice has an enhanced level of soluble fiber as well as good physical and chemical properties (i.e., non-sticky and suitable moisture content) which make it ideal for cereal manufacture. Indeed, the resulting cooked rice surprisingly has better physical properties (i.e., non-stickiness) than conventional rice prepared without soluble fiber normally used to prepare rice-based cereal. The fully cooked rice is then dried or tempered to a moisture content of about 17 to 23 percent, and preferably about 19 to 21 percent. The dried cooked rice is then treated using conventional cereal manufacturing techniques (e.g., bumping, flaking, puffing, toasting, coating, and the like) to obtain the fiber-enriched cereal product of this invention. Importantly, the infused fiber does not appear to adversely effect the remainder of the process using such conventional techniques. Indeed, it has surprisingly been found that the fiber-infused cooked rice of this invention is actually less sticky than cooked rice normally used to prepare conventional rice-based cereal produces and, thus, is easier to use in the remainder of the cereal making process as compared to conventional cooked rice.

The fiber-infused rice-based cereal products of this invention generally have total dietary fiber (i.e., soluble and insoluble fiber) of about 5 to about 25 percent; more preferably the fiber-infused rice-based cereal products have total dietary fiber of about 10 to about 15 percent total dietary fiber. These values compare with a typical fiber content of less than about 1 percent (and more generally in the range of about 0.5 to about 0.7 percent) in conventional rice-based cereals.

Preferably, the precooking, mixing, and cooking steps of FIG. 1 are carried out in a single vessel, preferably in a rotatable pressurized steam cooker. In an especially preferred embodiment, the steam cooker is preheated using steam. After draining out excess water, the dry rice and water (even more preferably with optional ingredients such as emulsifiers and minerals) are added and the rice is partially cooked in the rotating cooker for about 35 to about 50 minutes at a pressure of about 9 to about 20 psi (temperature of about 240 to about 260° F.) to provide a precooked rice having a moisture of about 10 to 20 percent. Typically, the amount of water mixed with rice in this precooking stage is about 5 to about 15 percent based on the rice. After the precooked rice has obtained its desired moisture content, the steam is turned off and the cooker is vented to atmospheric pressure. After opening the cooker, soluble fiber, additional water, and other optional ingredients (i.e., salt, colorant, and the like) are added. The cooker is sealed and then rotated without steam to homogeneously mix the various ingredients; generally a mixing time of about 10 to 60 minutes is sufficient. Thereafter, steam is reintroduced and cooking is continued for about 10 to 40 minutes at a pressure of about 9 to 20 psi (temperature of about 240 to about 260° F.) to provide a cooked rice infused with soluble fiber and having a moisture of about 28 to 42 percent.

The fiber-infused rise is preferably removed from the cooker, cooled, and then dried to a moisture content of about 17 to about 23 percent and preferably to about 19 to 21 percent. The resulting dried rice is then further processed using conventional cereal making techniques (e.g., bumping, flaking, puffing, toasting, coating, and the like) to obtain the fiber-enriched cereal product of this invention.

Any soluble fiber may be used in the present invention so long as, using the process of this invention, the fiber is infused into the rice particles or grains and the presence of the particular soluble fiber does not adversely effect the remainder of the cereal making process (i.e., after preparation of the fiber infused rice) in a significant manner. Suitable soluble fibers include, for example, polydextrose, maltodextrins, resistant maltodextrins, inulin, guar gum, carbomethyl cellulose, high methoxy pectin, and the like as well as mixtures thereof. The preferred soluble fiber is polydextrose.

Advantages and embodiments of this invention are further illustrated by the following examples but the particular materials and amounts thereof recited therein, as well as other conditions and details, should not be construed to unduly limit the invention. All parts, ratios, and percentages are by weight unless otherwise directed. All publications, including patents and published patent applications, are hereby incorporated by reference.

Example 1

A rotatable steam pressure cooker was preheated for about 30 minutes at atmospherics pressure with steam of about 10 psi. Rice (35.5 lbs), water (3.5 lbs), emulsifier (29.5 g; Myvaplex—a glycerol monostearate emulsifier from Eastman Chemical Co.), and minerals (6.3 g; reduced iron/zinc oxide blend) were added to the preheated cooker. As the cooker rotated, the rice was precooked with steam at a pressure of about 15 psi (temperature at about 250° F.) for about 40 minutes to obtain the precooked rice with a moisture content of about 15 percent. After turning the steam off, the cooker was vented to atmospheric pressure; a cooker syrup (14.8 lbs) containing polydextrose as the soluble fiber was added. The cooker syrup contained water (19.8 percent), liquid polydextrose (52.2 percent; obtained from Danisco USA, Inc.), salt brine (25.2 percent; consisting of about 25 percent water and about 75 percent salt), and colorant (188 g; Caramel RT-80 from Sethness Products Co.). The cooker was sealed and then rotated without steam for about 25 minutes to form a homogenous mixture; visually, the colorant was homogeneously distributed throughout the rice. The homogenous mixture was then cooked for an additional 25 minutes at a pressure of 15 psi (temperature of about 250° F.) to obtain fiber-infused cooked rice with a moisture content of about 33 percent. After turning the steam off, the cooker was then vented to atmospheric pressure; the fiber-infused rice was cooled with air and then removed from the cooker.

The fiber-infused cooker rice was then dried to about 19 percent moisture and then used to prepare a puffed rice cereal using conventional cereal making procedures. The resulting puffed rice cereal contained about 13.9 percent total dietary fiber. In spite of the significant level of fiber, the cereal has the appearance and organoleptic properties of conventional puffed rice cereal.

What is claimed is:

1. A method for producing a fiber-containing rice-based cereal, said method comprising:
    (1) precooking dried rice to form a partially hydrated rice having a first moisture content of about 10 to about 20 percent;
    (2) adding soluble fiber to the partially hydrated rice to form a rice-fiber composition;
    (3) gently mixing the rice-fiber composition to form a homogeneous mixture of the partially hydrated rice and soluble fiber;
    (4) cooking the homogenous mixture to complete hydration of the rice to obtain a cooked rice composition wherein the rice is infused with the soluble fiber and wherein the cooked rice composition has a second moisture content of about 28 to about 42 percent;
    (5) drying the cooked rice composition to a third moisture content of about 15 to about 23 percent to obtain a dried cooked rice composition; and
    (6) treating the dried cooked rice composition by a treatment selected from the group consisting of puffing, flaking, bumping and combinations thereof to form the fiber-containing rice-based cereal which has from about 5 to about 25 percent total dietary fiber.

2. The method of claim 1, wherein the fiber-containing rice-based cereal contains more than about 10 percent total dietary fiber.

3. The method as defined in claim 1, wherein the dried rice has an initial total dietary fiber content of less than about 5 percent.

4. The method as defined in claim 3, wherein the soluble fiber is selected from the group consisting of polydextrose, maltodextrins, resistant maltodextrins, inulin, guar gum, carbomethyl cellulose, high methoxy pectin, and mixtures thereof.

5. The method as defined in claim 4, wherein the soluble fiber is selected from the group consisting of polydextrose, maltodextrins, resistant maltodextrins, inulin, guar gum, carbomethyl cellulose, high methoxy pectin, and mixtures thereof.

6. The method as defined in claim 5, wherein dried rice is precooked in a rotatable steam cooker for about 35 to about 50 minutes at a pressure of about 9 to about 20 psi; wherein the rice-fiber composition is gently mixed in the rotatable steam cooker without steam for about 10 to 60 minutes; and wherein the homogeneous mixture is cooked in the rotatable steam cooker for about 10 to 40 minutes at a pressure of about 9 to 20 psi.

7. The method as defined in claim 4, wherein dried rice is precooked in a rotatable steam cooker for about 35 to about 50 minutes at a pressure of about 9 to about 20 psi; wherein the rice-fiber composition is gently mixed in the rotatable steam cooker without steam for about 10 to 60 minutes; and wherein the homogeneous mixture is cooked in the rotatable steam cooker for about 10 to 40 minutes at a pressure of about 9 to 20 psi.

8. The method as defined in claim 1, wherein the dried rice has been cleaned, milled, and polished and has an initial total dietary fiber content of less than about 1 percent.

9. The method as defined in claim 1, wherein the soluble fiber is selected from the group consisting of polydextrose, maltodextrins, resistant maltodextrins, inulin, guar gum, carboxymethyl cellulose, high methoxy pectin, and mixtures thereof.

10. The method as defined in claim 9, wherein dried rice is precooked in a rotatable steam cooker for about 35 to about 50 minutes at a pressure of about 9 to about 20 psi; wherein the rice-fiber composition is gently mixed in the rotatable steam cooker without steam for about 10 to 60 minutes; and wherein the homogeneous mixture is cooked in the rotatable steam cooker for about 10 to 40 minutes at a pressure of about 9 to 20 psi.

11. A method of preparing fiber-infused cooked rice, said method comprising:
    (1) precooking dried rice to form a partially hydrated rice having a first moisture content of about 10 to about 20 percent;
    (2) adding soluble fiber to the partially hydrated rice to form a rice-fiber composition;
    (3) gently mixing the rice-fiber composition to form a homogeneous mixture of the partially hydrated rice and soluble fiber;
    (4) cooking the homogenous mixture to complete hydration of the rice to obtain a cooked rice composition wherein the rice is infused with the soluble fiber and wherein the cooked rice composition has a second moisture content of about 28 to about 42 percent; and
    (5) drying the cooked rice composition to a third moisture content of about 15 to about 23 percent to obtain the fiber-infused cooked rice having from about 5 to about 25 weight percent total dietary fiber and wherein the dried cooked rice is treatable by a treatment selected from the group consisting of puffing, flaking, bumping and combinations thereof to form the fiber-containing rice-based cereal.

12. The method as defined in claim 11, wherein the dried rice has an initial total dietary fiber content of less than about 5 percent.

13. The method as defined in claim 11, wherein the dried rice has been cleaned, milled, and polished and has an initial total dietary fiber content of less than about 1 percent.

14. The method as defined in claim 11, wherein the soluble fiber is selected from the group consisting of polydextrose, maltodextrins, resistant maltodextrins, inulin, guar gum, carbomethyl cellulose, high methoxy pectin, and mixtures thereof.

15. The method of claim 11, wherein the soluble fiber is polydextrose.

16. The method of claim 11, wherein the fiber-infused cooked rice contains more than about 10 percent total dietary fiber.

17. The method as defined in claim 11, wherein dried rice is precooked in a rotatable steam cooker for about 35 to about 50 minutes at a pressure of about 9 to about 20 psi; wherein the rice-fiber composition is gently mixed in the rotatable steam cooker without steam for about 10 to 60 minutes; and wherein the homogeneous mixture is cooked in the rotatable steam cooker for about 10 to 40 minutes at a pressure of about 9 to 20 psi.

18. The method as defined in claim 17, wherein the dried rice has an initial total dietary fiber content of less than about 5 percent.

19. The method as defined in claim 18, wherein the soluble fiber is selected from the group consisting of polydextrose, maltodextrins, resistant maltodextrins, inulin, guar gum, carbomethyl cellulose, high methoxy pectin, and mixtures thereof.

20. The method as defined in claim 17, wherein the dried rice has been cleaned, milled, and polished and has an initial total dietary fiber content of less than about 1 percent.

21. The method as defined in claim 20, wherein the soluble fiber is selected from the group consisting of polydextrose, maltodextrins, resistant maltodextrins, inulin, guar gum, carbomethyl cellulose, high methoxy pectin, and mixtures thereof.

22. The method as defined in claim 17, wherein the soluble fiber is selected from the group consisting of polydextrose, maltodextrins, resistant maltodextrins, inulin, guar gum, carbomethyl cellulose, high methoxy pectin, and mixtures thereof.

23. The method of claim 17, wherein the soluble fiber is polydextrose.

* * * * *